(12) United States Patent
Resconi et al.

(10) Patent No.: US 7,943,716 B2
(45) Date of Patent: May 17, 2011

(54) PROCESS FOR POLYMERIZING 1-HEXENE OR HIGHER ALPHA-OLEFINS

(75) Inventors: Luigi Resconi, Ferrara (IT); Eleonora Ciaccia, Ferrara (IT); Friederike Morhard, Ferrara (IT); Giampaolo Pellegatti, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 1066 days.

(21) Appl. No.: 10/592,563

(22) PCT Filed: Mar. 8, 2005

(86) PCT No.: PCT/EP2005/002481
§ 371 (c)(1),
(2), (4) Date: Jul. 18, 2008

(87) PCT Pub. No.: WO2005/095474
PCT Pub. Date: Oct. 13, 2005

(65) Prior Publication Data
US 2008/0281060 A1 Nov. 13, 2008

Related U.S. Application Data

(60) Provisional application No. 60/554,110, filed on Mar. 17, 2004, provisional application No. 60/610,064, filed on Sep. 15, 2004.

(30) Foreign Application Priority Data

Mar. 12, 2004 (EP) .................................. 04101020
Sep. 9, 2004 (EP) .................................. 04104351

(51) Int. Cl.
*C08F 4/6592* (2006.01)
*C08F 4/642* (2006.01)
*C08F 210/06* (2006.01)
*C08F 210/08* (2006.01)

(52) U.S. Cl. ..................... 526/348.4; 526/160; 526/161; 526/165; 526/348.6; 526/943

(58) Field of Classification Search .................. 526/160, 526/161, 165, 384.6, 348.4, 943
See application file for complete search history.

(56) References Cited

U.S. PATENT DOCUMENTS

| | | | |
|---|---|---|---|
| 5,043,515 A | 8/1991 | Slaugh et al. |
| 5,066,631 A | 11/1991 | Sangokoya et al. |
| 5,145,819 A | 9/1992 | Winter et al. |
| 5,239,022 A | 8/1993 | Winter et al. |
| 5,243,001 A | 9/1993 | Winter et al. |
| 5,324,800 A | 6/1994 | Welborn, Jr. et al. |
| 5,556,928 A | 9/1996 | Devore et al. |
| 5,847,177 A | 12/1998 | Sangokoya et al. |
| 6,232,421 B1 | 5/2001 | Fujita et al. |
| RE37,384 E | 9/2001 | Winter et al. |
| 6,444,607 B1 | 9/2002 | Gonioukh et al. |
| 6,566,544 B1 | 5/2003 | Waymouth et al. |
| 6,664,208 B1 | 12/2003 | Fujita et al. |
| 6,953,829 B2 | 10/2005 | Kratzer et al. |
| 7,101,940 B2 | 9/2006 | Schottek et al. |

FOREIGN PATENT DOCUMENTS

| | | |
|---|---|---|
| CA | 2220243 | 9/1997 |
| DE | 19962814 | 6/2001 |
| DE | 19962910 | 7/2001 |
| EP | 129368 | 12/1984 |
| EP | 172961 | 3/1986 |
| EP | 480390 | 4/1992 |
| EP | 485820 | 5/1992 |
| EP | 485822 | 5/1992 |
| EP | 485823 | 5/1992 |
| EP | 604908 | 7/1994 |
| EP | 707016 | 4/1996 |
| GB | 999725 | 7/1965 |

(Continued)

OTHER PUBLICATIONS

D. Coevoet et al., "Activation of iPr(CpFluo)ZrCl$_2$ by methylaluminoxane, 3$^a$-Kinetic investigation of the syndiospecific hex-1-ene polymerization in hydrocarbon and chlorinated media," *Macromol. Chem. Phys. 200*, p. 1208-1214 (1999).
Y. Yamaguchi et al., "Stereospecific Polymerization of 1-Hexene Catalyzed by ansa-metallocene/-methylaluminoxane Systems under High Pressure," *Journal of Polymer Science: Part A: Polymer Chemistry*, vol. 37, p. 283-292 (1999).
V. Grumel et al., "Homopolymerization of Higher 1-Olefins with Metallocene/MAO Catalysts," *Macromolecular Materials & Engineering*, vol. 286, p. 480-487 (2001).

(Continued)

*Primary Examiner* — Caixia Lu
(74) *Attorney, Agent, or Firm* — Dilworth IP, LLC

(57) ABSTRACT

A process for preparing a polymer containing derived units of one or more alpha olefins of formula $CH_2$=CHW wherein W is a $C_3$-$C_{10}$ hydrocarbon radical and optionally from 0 to 81% by mol of derived units of propylene or 1-butene, comprising contacting under polymerization conditions one or more alpha olefins of formula $CH_2$=CHW and optionally propylene or 1-butene in the presence of a catalyst system obtainable by contacting:
a) a metallocene compound of formula (I)

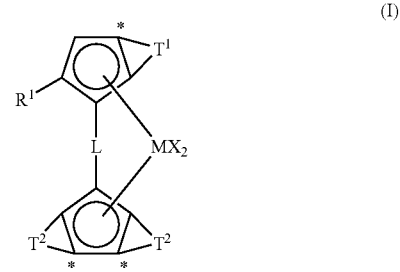

wherein M, X, L, $T^1$, $T^2$, $T^3$ and $R^1$ are described in the text; and
(b) an alumoxane or a compound capable of forming an alkyl metallocene cation.

5 Claims, No Drawings

FOREIGN PATENT DOCUMENTS

| | | |
|---|---|---|
| WO | 91/02012 | 2/1991 |
| WO | 92/00333 | 1/1992 |
| WO | 96/22995 | 8/1996 |
| WO | 98/18801 | 5/1998 |
| WO | 98/22486 | 5/1998 |
| WO | 99/21899 | 5/1999 |
| WO | 99/24446 | 5/1999 |
| WO | 99/58539 | 11/1999 |
| WO | 01/21674 | 3/2001 |
| WO | 01/44318 | 6/2001 |
| WO | 01/46278 | 6/2001 |
| WO | 01/47939 | 7/2001 |
| WO | 01/62764 | 8/2001 |
| WO | 03/045964 | 6/2003 |

OTHER PUBLICATIONS

M. Arnold et al., "Copolymerization of propene and higher α-olefins with the metallocene catalyst Et[Ind]$_2$HfCl$_2$$^{a)}$/methylaluminoxane," *Macromol. Chem. Phys.*, vol. 197, p. 563-573 (1996).

R. Thomann et al., "Crystallisation of syndiotactic poly(propene-co-octene)," *Polymer*, vol. 39(10), p. 1907-1915 (1998).

T. Sugano et al., "Effect of catalyst isospecificity on the copolymerization of propene with 1-hexene," *Makromol. Chem.*, vol. 193, p. 43-51 (1992).

PROCESS FOR POLYMERIZING 1-HEXENE OR HIGHER ALPHA-OLEFINS

This application is the U.S. national phase of International Application PCT/EP2005/002481, filed Mar. 8, 2005, claiming priority to European Patent Application 04101020.8 filed Mar. 12, 2004, and European Patent Application 04104351.4 filed Sep. 9, 2004, and the benefit under 35 U.S.C. 119(e) of U.S. Provisional Application No. 60/554,110, filed Mar. 17, 2004 and U.S. Provisional Application No. 60/610,064 filed Sep. 15, 2004; the disclosures of International Application PCT/EP2005/002481, European Patent Applications 04101020.8 and 04104351.4 and U.S. Provisional Application Nos. 60/554,110 and 60/610,064, each as filed, are incorporated herein by reference.

The present invention relates to a process for obtaining a polymer comprising 1-hexene or higher alpha-olefins derived units, by using a specific class of metallocene compounds, that allows to obtain polymers having high molecular weight in high yields.

Metallocene compounds are well known catalyst components for the polymerization of alpha-olefins. However they are mainly used for the (co)polymerization of ethylene, propylene and 1-butene. Polymerization of 1-hexene and higher alpha olefins by using metallocene catalyst components is discussed in some papers. For example U.S. Pat. No. 6,566,544 discloses in table 10 the polymerization of 1-hexene by using $Ind_2ZrMe_2$ and bis(2-phenylindenyl)zirconium dimethyl. The molecular weight of the obtained polymers are quite low. In Macromol. Chem. Phys. 200, 1208-1219 (1999), 1-hexene is polymerized in the presence of $iPr(CpFlu)ZrCl_2$. The polymer has a syndiotactic structure and the molecular mass of the polymer obtained is close to 20000 gmol$^{-1}$. In Journal of Polymer Science: Part A: Polymer Chemistry, Vol 37, 283-292 (1999) a series of metallocene compounds have been tested in 1-hexene polymerization. Rac-$[Me_2Ge(\eta^5-C_5H-2,3,5-Me_3)MCl_2$ (M=Zr or Hf) allows to obtain 1-hexene polymers having a very high molecular weight. However the drawback of this compound is that it is necessary to separate the racemic from the meso form, this makes the synthesis of such compound much more difficult and expensive than the metallocene compound of the present invention. In the same article is also shown that isopropyliden(9-fluorenyl)(cyclopentadienyl)zirconium dichloride produces 1-hexene polymer having very low molecular weight, with respect to the other compounds tested. The behaviour of isopropyliden(9-fluorenyl)(cyclopentadienyl)zirconium dichloride is confirmed in Macromol. Mater. Eng. 2001, 286, 480-487. In this paper the molecular weight (Mw) of 1-hexene polymer obtained by using said compound is about 45000.

WO 01/46278 relates to a polymerization process for producing a copolymer containing from 60 to 94% mol of alpha olefins having from 3 to 6 carbon atoms, and from 6 to 40% mol of alpha olefins having at least one carbon atom more than the first one. In the examples propylene is copolymerized with 1-hexene. These copolymers are obtained with a metallocene compound different from that one used in the present invention, moreover the molecular weight of the obtained copolymers can still be improved. Finally the present invention is directed to a copolymer that contains a smaller amount of propylene or 1-butene.

In Macromol. Chem. Phys. 197, 563-573 (1996) are described a series of hexene propylene copolymers having various content of comonomer from 0 to 100% by mol. The copolymers are obtained by using $Et(Ind)_2HfCl_2$ and both the yields and the molecular weight of the obtained polymers can be further improved.

Thus there is still the need to find a class of metallocene compounds easy to prepare and without the drawback to separate the racemic from the meso form able to give 1-hexene or higher alpha-olefins (co)polymers having an high molecular weight in high yields.

An object of the present invention is a process for preparing a polymer containing derived units of one or more alpha olefins of formula $CH_2\!=\!CHW$ wherein W is a $C_3$-$C_{10}$ hydrocarbon radical and optionally from 0 to 81% by mol; preferably from 0 to 70% by mol, more preferably from 0 to 59% by mol, of derived units of propylene or 1-butene, comprising contacting under polymerization conditions one or more alpha olefins of formula $CH_2\!=\!CHW$ and optionally propylene or 1-butene in the presence of a catalyst system obtainable by contacting:

a) a metallocene compound of formula (I)

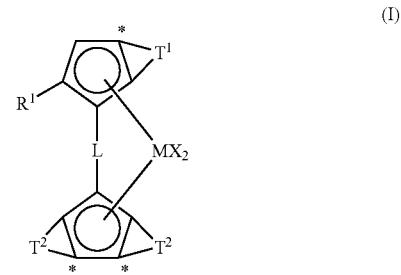

(I)

wherein:

M is an atom of a transition metal selected from those belonging to group 3, 4, or to the lanthanide or actinide groups in the Periodic Table of the Elements; preferably M is zirconium titanium or hafnium;

X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or ethyl radicals;

L is a divalent $C_1$-$C_{40}$ hydrocarbon radical optionally containing heteroatoms belonging to groups 13-17 of the Periodic Table of the Elements or a divalent silylene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silylene radical containing up to 5 silicon atoms such as $SiMe_2$, $SiPh_2$; preferably L is a group $(Z(R'')_2)_n$ wherein Z is a carbon or a silicon atom, n is 1 or 2 and R'' is a $C_1$-$C_{20}$ hydrocarbon radical optionally containing heteroatoms belonging to groups 13-17 of the Periodic Table of the Elements; preferably R'' is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, $SiPhMe$, $SiMe(SiMe_3)$, $CH_2$, $(CH_2)_2$, and $C(CH_3)_2$;

$R^1$, is a hydrogen atom, or a $C_1$-$C_{40}$ hydrocarbon radicals optionally containing heteroatoms belonging to groups 13-17 of the Periodic Table of the Elements; Preferably $R^1$ is a hydrogen atom or a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^1$ is linear or branched, saturated or unsaturated $C_1$-$C_{20}$-alkyl radicals, optionally containing heteroatoms belonging to groups 13-17 of the Periodic Table of the Elements; even more preferably $R^1$ is a $C_1$-$C_{10}$-alkyl radical such as a methyl, or ethyl radical;

$T^1$ is a moiety of formula (IIa) or (IIb):

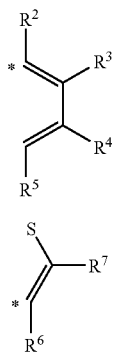

(IIa)

(IIb)

wherein the atom marked with the symbol * bonds the atom marked with the same symbol in the compound of formula (I);

$R^2$, $R^3$, $R^4$ and $R^5$, equal to or different from each other, are hydrogen atoms, or $C_1$-$C_{40}$ hydrocarbon radicals optionally containing heteroatoms belonging to groups 13-17 of the Periodic Table of the Elements; or two adjacent $R^2$, $R^3$, $R^4$ and $R^5$ can optionally form a saturated or unsaturated, 5 or 6 membered rings, said ring can bear $C_1$-$C_{20}$ alkyl radicals as substituents; Preferably $R^2$, $R^3$, $R^4$ and $R^5$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements;

$R^2$ is preferably a linear or branched, saturated or unsaturated $C_1$-$C_{20}$-alkyl radical, optionally containing heteroatoms belonging to groups 13-17 of the Periodic Table of the Elements; preferably $R^2$ is a $C_1$-$C_{10}$-alkyl radical; more preferably $R^2$ is a methyl, ethyl or isopropyl radical;

$R^4$ is preferably a hydrogen atom or a $C_1$-$C_{10}$-alkyl radical such as a methyl, ethyl or isopropyl radical;

$R^5$ is preferably a hydrogen atom or linear or branched, saturated or unsaturated $C_1$-$C_{20}$-alkyl radical, optionally containing heteroatoms belonging to groups 13-17 of the Periodic Table of the Elements; preferably a $C_1$-$C_{10}$-alkyl radical; more preferably $R^5$ is a methyl or ethyl radical;

$R^6$ and $R^7$, equal to or different from each other, are hydrogen atoms or $C_1$-$C_{40}$ hydrocarbon radicals optionally containing heteroatoms belonging to groups 13-17 of the Periodic Table of the Elements; or $R^6$ and $R^7$ can optionally form a saturated or unsaturated, 5 or 6 membered rings, said ring can bear $C_1$-$C_{20}$ alkyl radicals as substituents; preferably $R^6$ and $R^7$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements;

preferably $R^7$ is a hydrogen atom or a linear or branched, cyclic or acyclic $C_1$-$C_{20}$-alkyl radical; more preferably $R^7$ is a methyl or ethyl radical; preferably $R^6$ is a $C_1$-$C_{40}$-alkyl, $C_6$-$C_{40}$-aryl or a $C_7$-$C_{40}$-arylalkyl; more preferably $R^6$ is a group of formula (III)

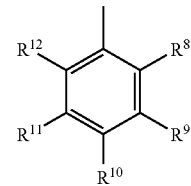

(III)

wherein $R^8$, $R^9$, $R^{10}$, $R^{11}$ and $R^{12}$, equal to or different from each other, are hydrogen atoms or $C_1$-$C_{20}$ hydrocarbon radicals; preferably $R^8$, $R^9$, $R^{10}$, $R^{11}$ and $R^{12}$ are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals; preferably $R^8$, and $R^{11}$ are a hydrogen atoms; $R^9$, $R^{10}$ and $R^{12}$ are preferably hydrogen atoms or linear or branched, cyclic or acyclic, $C_1$-$C_{10}$-alkyl radicals;

$T^2$, equal to or different from each other, are moieties of formula (IIc) or (IId):

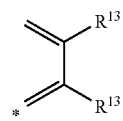

(IIc)

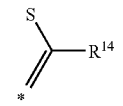

(IId)

wherein the atom marked with the symbol * bonds the atom marked with the same symbol in the compound of formula (I);

$R^{13}$, equal to or different from each other, are hydrogen atoms or $C_1$-$C_{40}$ hydrocarbon radicals optionally containing heteroatoms belonging to groups 13-17 of the Periodic Table of the Elements; or two $R^{13}$ can optionally form a saturated or unsaturated, 5 or 6 membered rings, said ring can bear $C_1$-$C_{20}$ alkyl radicals as substituents; preferably $R^{13}$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^{13}$ are a hydrogen atoms or linear or branched, $C_1$-$C_{20}$-alkyl radicals;

$R^{14}$, equal to or different from each other, are hydrogen atoms or $C_1$-$C_{40}$ hydrocarbon radicals optionally containing heteroatoms belonging to groups 13-17 of the Periodic Table of the Elements; preferably $R^{14}$ are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^{14}$ are linear or branched, $C_1$-$C_{20}$-alkyl radicals;

(b) an alumoxane or a compound capable of forming an alkyl metallocene cation; and optionally (c) an organo aluminum compound.

In one embodiment the compound of formula (I) has the following formula (IV)

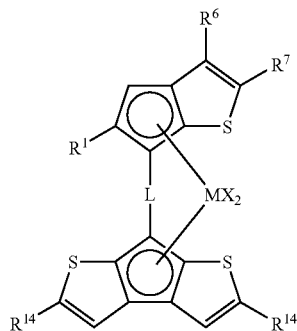

(IV)

wherein M, X, L, $R^1$, $R^6$, $R^7$, and $R^{14}$ are described above.

In a further alternative embodiment the compound of formula (I) has the following formula (V)

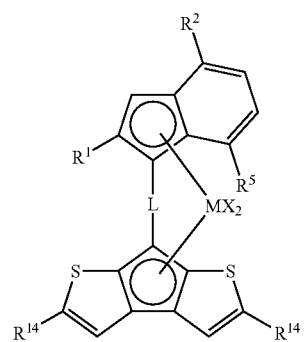

(V)

wherein M, X, L, $R^1$, $R^2$, $R^5$ and $R^{14}$ are described above. compounds of formula (I) are well know in the art, they can be prepared for example as described in WO 01/47939 or EP 707 016.

Alumoxanes used as component b) can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

Alumoxanes used as component b) can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-allyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the process according to the invention are considered to be linear, branched or cyclic compounds containing at least one group of the type:

wherein the substituents U, same or different, are defined above.

In particular, alumoxanes of the formula:

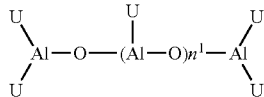

can be used in the case of linear compounds, wherein $n^1$ is 0 or an integer of from 1 to 40 and the substituents U are defined as above; or alumoxanes of the formula:

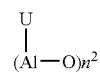

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TTBA), tris(2,4,4-trimethyl-pentyl)aluminium (TIOA), tris(2,3-dimethylbutyl)aluminium (TDMBA) and tris(2,3,3-trimethylbutyl)aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

Organic aluminum compounds used as compound iii) are those of formula $H_jAlU_{3-j}$ or $H_jAl_2U_{6-j}$ as described above.

The polymerization process of the present invention can be carried out in liquid phase, optionally in the presence of an inert hydrocarbon solvent. Said hydrocarbon solvent can be either aromatic (such as toluene) or aliphatic (such as propane, hexane, heptane, isobutane, cyclohexane and 2,2,4-trimethylpentane). Preferably, the polymerization process of the present invention is carried out by using the alpha olefin of formula $CH_2=CHW$ wherein W is a $C_3$-$C_{10}$ hydrocarbon radical such as 1-hexene or 1-octene as polymerization medium, i.e. the same olefin that is going to be polymerized for example 1-hexene is used as polymerization medium when a 1-hexene-based polymer is the wished polymer.

The polymerization temperature preferably ranges from 0° C. to 250° C.; more preferably it is comprised between 20° C. and 150° C. and, more particularly the polymerization temperature is between 40° C. and 90° C.;

The molecular weight distribution can be varied by using mixtures of different metallocene compounds or by carrying out the polymerization in several stages which differ as to the polymerization temperature and/or the concentrations of the molecular weight regulators and/or the monomers concentration. Moreover by carrying out the polymerization process by using a combination of two different metallocene compounds of formula (I) a polymer endowed with a broad melting is produced.

With the process of the present invention isotactic polymers endowed with high molecular weights can be obtained in high yields.

With the process of the present invention polymers containing derived units of one or more alpha olefins of formula $CH_2=CHW$ wherein W is a $C_3$-$C_{10}$ hydrocarbon radical and optionally from 0 to 81% by mol of derived units of propylene or 1-butene can be obtained. Examples of alpha olefins of formula $CH_2=CHW$ are 1-pentene; 1-hexene; 1-octene and 1-decene. Preferably 1-hexene and 1-octene are used; more preferably 1-hexene is used.

When said alpha olefins of formula $CH_2=CHW$ are copolymerized with propylene or 1-butene preferably the obtained copolymer has a content of derived units of propylene or 1-butene ranging from 0.1% by mol to 59% by mol; more preferably the content of propylene or 1-butene ranges from 10% by mol to 50% by mol, even more preferably it ranges from 19% by mol to 40% by mol.

The obtained copolymer is endowed with the following properties:
i) intrinsic viscosity IV measured in tetrahydronaphtalene (THN) at 135° C. higher than 0.90 dl/g; preferably higher than 1.20 dl/g; more preferably higher than 1.30 dl/g; even more preferably higher than 1.80 dl/g;

ii) distribution of molecular weight Mw/Mn lower than 3; preferably lower than 2.5; and iii) no enthalpy of fusion detectable at a differential scanning calorimeter (DSC) wherein the DSC measurement is carried out as described below.

Preferably in said copolymers the alpha olefin of formula $CH_2=CHW$ is 1-hexene or 1-octene.

The copolymers, other than the above properties, are further endowed with a very low Shore A (measured according to ISO 868), in particular the shore A is lower than 30; preferably lower than 25; more preferably lower than 20; and furthermore the tensile modulus is lower than 20 MPa (measured according to ASTM 5026,4092 e 4065); preferably lower than 15 MPa; more preferably lower than 11 MPa.

A further preferred range of content of derived units of propylene and 1-butene is from 19% by mol to 59% by mol; even more preferably from 30% by mol to 59% by mol.

The process of the present invention is particularly suitable for preparing homopolymers of alpha olefins of formula $CH_2=CHW$ wherein W is a $C_3$-$C_{10}$ hydrocarbon radical, in particular homopolymers of 1-hexene or 1-octene; preferably homopolymer of 1-hexene are produced.

The homopolymer prepared according to the present invention can be used for application known in the art such as masterbatches or in adhesive formulations.

Even if the homopolymer of the present invention are not exemplified, their preparation can be easily achieved by the skilled man once it is know the process for preparing the copolymers. In fact it is sufficient to avoid to add the comonomer in the processes exemplified above for obtaining the wished homopolymer.

The copolymers obtainable with the process of the present invention described above, can have the same uses of the homopolymer and furthermore they can be used as compatibilizer. For example they can improve the dispersion of a rubber phase in an crystalline matrix, due to the presence of the comonomer that help to compatibilize the two phases, so that a material having an improved izod impact value con be obtained.

The following examples are given to illustrate and not to limit the invention.

EXAMPLES

General Procedures and Characterizations

All chemicals were handled under nitrogen using standard Schlenk techniques. Methylalumoxane (MAO) was received from Albemarle as a 30% wt/vol toluene solution and used as such.

Pure triisobutylaluminum (TIBA) was used as such.

Isododecane was purified over aluminum oxide to reach a water content below 10 ppm.

A 101 g/L TIBA/isododecane solution was obtained by mixing the above components.

The melting points of the polymers ($T_m$) were measured by Differential Scanning Calorimetry (D.S.C.) on a Perkin Elmer DSC-7 instrument, according to the standard method. A weighted sample (5-7 mg) obtained from the polymerization was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In this second heating run, the peak temperature was taken as the melting temperature ($T_m$) and the area of the peak as melting enthalpy ($\Delta H_f$).

Molecular weight parameters were measured using a Waters 150C ALC/GPC instrument (Waters, Milford, Mass., USA) equipped with four mixed-gel columns PLgel 20 μm Mixed-A LS (Polymer Laboratories, Church Stretton, United Kingdom). The dimensions of the columns were 300×7.8 mm. The solvent used was TCB and the flow rate was kept at 1.0 mL/min. Solution concentrations were 0.1 g/dL in 1,2,4 trichlorobenzene (TCB). 0.1 g/L of 2,6-di-t-butyl-4-methyl phenol (BHT) was added to prevent degradation and the injection volume was 300 μL. All the measurements were carried out at 135° C. GPC calibration is complex, as no well-characterized narrow molecular weight distribution standard reference materials are available for 1-hexene polymers. Thus, a universal calibration curve was obtained using 12 polystyrene standard samples with molecular weights ranging from 580 to 13,200,000. It was assumed that the K values of the Mark-Houwink relationship were: $K_{PS}=1.21\times10^{-4}$, dL/g and $K_{PH}=1.78\times10^{-4}$ dL/g for polystyrene and poly-1-hexene respectively, for the copolymers the same $K_{PH}$ has been used. The Mark-Houwink exponents a were assumed to be 0.706 for polystyrene and 0.725 for poly-1-hexene and copolymers. Even though, in this approach, the molecular parameters obtained were only an estimate of the hydrodynamic volume of each chain, they allowed a relative comparison to be made.

The intrinsic viscosity (I.V.) was measured in tetrahydronaphtalene (THN) at 135° C. Rac dimethylsilyl{(2,4,7-trimethyl-1-indenyl)-7-(2,5-dimethyl-cyclopenta[1,2-b:4,3-b']-dithiophene)}zirconium dimethyl (A-1) was prepared according to the following procedure: the ligand, [3-(2,4,7-trimethylindenyl)][7-(2,5-dimethyl-cyclopenta[1,2-b:4,3-b']-dithiophene)]dimethyl silane, was prepared as described in WO 01/47939. 30.40 g of this ligand (72.26 mmol) and 170 ml of anhydrous THF were charged under nitrogen in a cylindrical glass reactor equipped with magnetic stirring bar. The brown solution so obtained was cooled and maintained at 0° C., while 58.4 ml of n-BuLi 2.5M in hexane (146 mmol) were added dropwise via dropping funnel. At the end of the addition, the dark brown solution was stirred for 1 hour at room temperature, then cooled to −50° C., and then 48.6 ml of MeLi 3.05 M in diethoxymethane (148.2 mmol) were added to it. In a Schlenk, 16.84 g of $ZrCl_4$ (72.26 mmol) were slurried in 170 ml of toluene. Both mixtures were kept at −50° C. and the $ZrCl_4$ slurry was quickly added to the ligand dianion solution. At the end of the addition, the reaction mixture was allowed to reach room temperature and stirred for an additional hour. A yellow-green suspension was obtained. $^1H$ NMR analysis shows complete conversion to the target complex. All volatiles were removed under reduced pressure, and the obtained free flowing brown powder was suspended in 100 ml of $Et_2O$. After stirring for a few minutes, the suspension was filtered over a G4 frit. The solid on the frit was then washed twice with $Et_2O$ (until the washing solvent turns from brown to yellow), then dried under vacuum, and finally extracted on the frit with warm toluene (60° C.), until the filtering solution turns from yellow to colorless (about 650 ml of toluene); The extract was dried under reduced pressure to give 28.6 g of yellow powder, which $^1H$-NMR showed to be the target complex, free from impurities. The yield based on the ligand was 73.3%.

$^1H$-NMR: ($CD_2Cl_2$, r.t.), ppm: −2.09 (s, 3H), −0.79 (s, 3H), 1.01 (s, 3H), 1.04 (s, 3H), 2.38 (s, 3H), 2.39 (s, 3H), 2.43 (d, 3H, J=1.37 Hz), 2.52 (s, 3H), 2.57 (d, 3H, J=1.37 Hz), 6.61 (dq, 1H, J=7.04 Hz, J=0.78 Hz), 6.81 (q, 1H, J=1.37 Hz), 6.85 (dq, 1H, J=7.04 Hz, J=0.78 Hz), 6.87 (q, 1H, J=1.37 Hz), 6.91 (s, 1H).

Flexural modulus, stress at break and elongation at break have been measured according to ISO 527-1 and ISO 178, Stress at yield and elongation at yield have been measured according to ASTM D 638, tensile modulus has been measured according to ASTM D 790, melt flow rate under the condition 230° C./2.16 kg is measured according to ISO 1133. Izod has been measured according to ASTM D256.

Preparation of Catalyst Systems
Preparation of Catalyst System C-1

9.7 cc of TIBA/isododecane solution were mixed with 1.9 cc of 30% MAO/toluene solution (MAO/TIBA, molar ratio 2:1). Then, 20 mg of A-1 were dissolved with this solution. The metallocene was completely soluble, the dark violet solution did not show any trace of residual solid. The final solution was obtained upon recovery of 2.0 cc by distillation. MAO/TIBA 2:1 mol/mol; $Al_{tot}/Zr=400$. This solution was used to perform 1-hexene polymerization.

Polymerization Tests 1-hexene Copolymerisation

An amount of liquid 1-hexene as indicated in table 2 were fed in a 250 ml glass vessel reactor at room temperature. The reactor had been maintained under slight positive nitrogen atmosphere. Consequently the temperature was increased to the polymerization temperature indicated in table 2. An over pressure of 1 bar-g of propylene or 1-butene was fed in the autoclave. The catalyst solution, (ageing indicated in table 2), was transferred into the liquid, under a nitrogen flow. The pressure was increased with propylene until reaching the polymerisation pressure indicated in table 2. The polymerization was conducted for 60 minutes, then it was stopped by venting the monomers and the polymer was precipitated by adding acetone to the polymer solution. The recovered polymer was dried at 50° C. under vacuum. Polymerization and polymer data are reported in table 2.

TABLE 2

| Ex | Cat (mg. of A-1) | 1-hexene g | Monomer (bar-g) | Pol. Temp. ° C. | Ageing hours | Activity Kg/g met/h | 1-hexene mol % | Mw | Mw/Mn | IV (THN) dl/g | ΔH |
|---|---|---|---|---|---|---|---|---|---|---|---|
| 2 | C-2 (0.38) | 67 | propylene (3) | 50 | 1 | 11 | 76.5 | n.a. | n.a. | 2.46 | n.d. |
| 3 | C-2 (0.38) | 67 | propylene (6) | 50 | 4 | 32 | 58.5 | n.a. | n.a. | 2.53 | n.d. |
| 4 | C-2 (0.31) | 40 | 1-butene (2) | 50 | 450 | 30 | 53.1 | 396371 | 2.2 | 3.20 | n.d.. |
| 5 | C-2 (0.31) | 40 | 1-butene (2) | 70 | 450 | 43 | 80.8 | 285718 | 1.9 | 1.33 | n.d.. | n.a. not available
n.d. not detectable 1-hexene Homopolymerization, General Procedure.

To 20 g of liquid 1-hexene an amount of the catalyst solution obtained as reported above containing 0.5 mg of metallocene, is added at 50° C. After 30 minutes, the polymerization is stopped with ethanol. Then, acetone is added to separate the polymer. Finally, the polymer is dried at 50° C. under vacuum for several hours. The results of the 1-hexene polymerization tests are reported in Table 1.

TABLE 1

1-hexene polymerization results.

| Ex | Cat. | Ageing, days | Yield, g | Activity Kg/$g_{met}$h |
|---|---|---|---|---|
| 1 | C-1 | 1 | 13.46 | 53.8 |

Preparation of Catalyst System C-2 A1/MAO:TIBA 2:1 (400)

33.3 ml of TIBA/isododecane solution (101 g/L) was mixed with 7.9 cc of MAO/toluene solution (Albemarle –30% wt) to obtain a MAO/TIBA molar ratio of 2:1. The solution was stirred for 1 hour at room temperature. Then, 69 mg of A-1 was dissolved in the solution.

The dark violet solution did not show any trace of residual solid.

The final solution was diluted with 13 ml of isododecane to reach a concentration of 100 g/L.

1-hexene/propylene or 1-butene copolymerisation 4 mmol of Al(i-Bu)$_3$ (as a 1M solution in hexane) and 1000 g of 1-hexene were charged at room temperature in a 4-L jacketed stainless-steel autoclave, previously purified by washing with an Al(i-Bu)$_3$ solution in hexane and dried at 50° C. in a stream of nitrogen. The autoclave was then thermostated at the polymerisation temperature, 70° C., and then the solution containing the catalyst/cocatalyst solution indicated in table 3 aged as indicated in table 3 was injected in the autoclave by means of nitrogen pressure through the stainless-steel vial. The monomer was fed until a pressure indicated in table 3 and the polymerisation carried out at constant temperature for 1 hour. The polymerization solution was discharged into a heated steel tank containing water at 70° C. The tank heating was switched off and a flow of nitrogen at 0.5 bar-g was fed. After cooling at room temperature, the steel tank was opened and the wet polymer collected and dried at 70° C. under reduced pressure. The polymerisation conditions and the characterisation data of the obtained polymers are reported in Table 3.

TABLE 3

| Ex | Cat (mg. of A-1) | Monomer (bar-g) | Activity Kg/g met/h | 1-hexene mol % | Mw | Mw/Mn | IV (THN) dl/g | ΔH |
|---|---|---|---|---|---|---|---|---|
| 6 | C-2 (2.58) | propylene (20) | 83 | 43 | 232200 | 1.9 | 1.4 | n.d. |
| 7 | C-2 (1.28) | propylene (19) | 117 | 20.7 | 229100 | 2.0 | 1.51 | n.a. |
| 8 | C-2 (2.56) | 1-butene (5) | 20 | 41 | 217200 | 2.3 | 1.25 | n.d. |
| 9 | C-2 (2.6) | Propylene (22) | 148 | 46 | 217433 | 1.9 | 1.27 | n.d. |

The shore A (ISO 868) of copolymer of examples 6 and 8 has been measured, the results are reported in table 4. The tensile modulus of a sample of copolymers obtained in examples 6 and 8 has been measured according to (ASTM 5026,4092 e 4065) as follows: Specimens for tensile test are cut from compression moulding plaques. Specimen sizes are approx. 40 mm long overall, 20 mm inter-clamp length, 6 mm width and thickness was 1 mm. Specimen is clamped in the SEIKO DMS 6100 tensile DMTA.

The applied frequency is 1 Hz.

Specimens are heated from −80° C. to +140° C. with 2° C./min as heating rate; specimens are re-clamped at the low temperature.

The results are reported in table 4

TABLE 4

| Ex | shore A | tensile modulus (MPa) |
|---|---|---|
| 6 | 19 | <10 |
| 8 | 7 | <10 |

Blends

Samples of copolymers obtained in examples 6, 7 and 9 have been blended with Moplen(T)HP500N a propylene homopolymer sold by Basell. three blends have been obtained by mixing in an extruder 20% of the copolymers of examples 6, 7 and 8 and 80% of Moplen HP500N. The blends marked as BA (copolymer of example 6); BB (copolymer of example 7) and BC (copolymer of example) have been analyzed in order to evaluate the mechanical properties, the results are reported in table 5

TABLE 5

| Blend | | BC | BA | BB | HP500N |
|---|---|---|---|---|---|
| Melt flow rate | g/10 min | 13.1 | 13.1 | 14.3 | 1.8 |
| Tensile modulus (DMTA) 23° C. | MPa | 1275 | 1130 | 1060 | 1450 |
| Stress at yield | N/MM2 | 24.8 | 23.7 | 21.5 | 33 |
| Elongation at yield | % | 12.3 | 13 | 13.5 | n.a. |
| Stress at break | N/MM2 | 16.6 | 15.4 | 12.6 | n.a. |
| Elongation at break | % | 70 | 65 | 60 | n.a. |
| IZOD at 23° C. | J/M | 62.9 | 57.6 | 55 | n.a. |
| IZOD at −20° C. | J/M | 17 | 18.5 | 17 | n.a. | n.a. not available

It can be seen that the blend are much more softer than the homopolymer alone in fact, for example in the blend the tensile modulus is considerably lowered with respect to the homopolymer alone.

A blend of 8% of the copolymer obtained in example 6 and 82% of Hifax(T) 7378 heterophasic blend comprising a crystalline matrix and a rubber phase sold by Basell has been obtained n a brandbury mixer. The resulting blend (BD) was analysed, the data are reported in table 6

TABLE 6

| Blend | | BD | Hifax 7378 |
|---|---|---|---|
| Flexural modulus | MPa | 1030 | 705 |
| IZOD at 23° C. | J/M | 11.3 | 11.9 |
| IZOD at −20° C. | J/M | 6.6 | 5.8 |

The invention claimed is:

1. A process for preparing a polymer containing derived units of 1-hexene and 10% to 50% by mol of derived units of propylene or 1-butene, and having an intrinsic viscosity of higher than 1.8 dl/g, the process comprising contacting under polymerization conditions hexene and propylene or 1-butene in the presence of a catalyst system obtained by contacting:

a) a metallocene compound of formula (V):

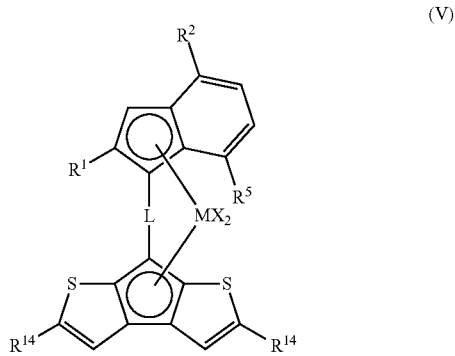

wherein:

M is an atom of a transition metal selected from those belonging to group 3, 4, or to the lanthanide or actinide groups in the Periodic Table of the Elements;

X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals;

L is a divalent $C_1$-$C_{40}$ hydrocarbon radical optionally containing heteroatoms belonging to groups 13-17 of the Periodic Table of the Elements or a divalent silylene radical containing up to 5 silicon atom;

$R^1$ is linear or branched, saturated or unsaturated $C_1$-$C_{20}$-alkyl radicals, optionally containing heteroatoms belonging to groups 13-17 of the Periodic Table of the Elements;

$R^2$ is a linear or branched, saturated or unsaturated $C_1$-$C_{20}$-alkyl radical, optionally containing heteroatoms belonging to groups 13-17 of the Periodic Table of the Elements;

$R^5$ is a hydrogen atom or linear or branched, saturated or unsaturated $C_1$-$C_{20}$-alkyl radical, optionally containing heteroatoms belonging to groups 13-17 of the Periodic Table of the Elements;

$R^{14}$, equal to or different from each other, are hydrogen atoms or $C_1$-$C_{40}$ hydrocarbon radicals optionally containing heteroatoms belonging to groups 13-17 of the Periodic Table of the Elements; and (b) an alumoxane or a compound that forms an alkyl metallocene cation.

2. The process according to claim 1 wherein the catalyst system further comprises c) an organo aluminum compound.

3. The process according to claim 1 wherein in the compound of formula (V), M is titanium, zirconium or hafnium; X is a hydrogen atom, a halogen atom or a R group, wherein R has been defined as in claim 1; and L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silylene radical containing up to 5 silicon atoms.

4. The process according to claim 1 wherein in the compound of formula (V), L is a group $(Z(R'')_2)_n$ wherein Z is a carbon or a silicon atom, n is 1 or 2 and R'' is a $C_1$-$C_{20}$ hydrocarbon radical optionally containing heteroatoms belonging to groups 13-17 of the Periodic Table of the Elements.

5. The process according to claim 1 wherein the polymerization process is carried out using 1-hexene as a polymerization medium.

* * * * *